(12) United States Patent
Folting et al.

(10) Patent No.: US 8,341,163 B2
(45) Date of Patent: Dec. 25, 2012

(54) TECHNIQUES FOR FILTER SHARING

(75) Inventors: Allan Folting, Redmond, WA (US); Gabhan Berry, Whiterock (CA); Danny Khen, Bellevue, WA (US); Anatoly Grabar, Remond, WA (US); Andrew Garbuzov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 12/140,269

(22) Filed: Jun. 17, 2008

(65) Prior Publication Data

US 2009/0313250 A1   Dec. 17, 2009

(51) Int. Cl.
*G06F 7/00* (2006.01)
*G06Q 10/00* (2012.01)

(52) U.S. Cl. ............................................ 707/754; 705/5
(58) Field of Classification Search .................. 707/2, 5, 707/201, 754; 705/7
See application file for complete search history.

(56) References Cited

U.S. PATENT DOCUMENTS

| | | | |
|---|---|---|---|
| 7,225,195 B2 | 5/2007 | Avrahami et al. | |
| 7,380,071 B2 * | 5/2008 | Blumrich et al. | 711/146 |
| 2005/0154779 A1 * | 7/2005 | Cypher et al. | 709/202 |
| 2005/0204059 A1 * | 9/2005 | Namihira | 709/238 |
| 2005/0253874 A1 | 11/2005 | Lal et al. | |
| 2006/0017975 A1 | 1/2006 | Ly et al. | |
| 2007/0055688 A1 | 3/2007 | Blattner | |
| 2007/0061746 A1 | 3/2007 | Folting et al. | |
| 2007/0174245 A1 | 7/2007 | Folting et al. | |
| 2008/0162209 A1 * | 7/2008 | Gu et al. | 705/7 |
| 2008/0238925 A1 * | 10/2008 | Meehan et al. | 345/441 |

OTHER PUBLICATIONS

Chowdhary et al., "Model-Driven Dashboards for Business Performance Reporting", EDOC, Proceedings of the 10th IEEE International Enterprise Distributed Object Computing Conference, 2006, pp. 374-386.
"Plan dashboards and filter" (Retrieved Feb. 7, 2008), http://technet2.microsoft.com/Office/en-us/library/5fe87ec1-431e-4b7f-ae33-1e2edd8613b11033.mspx?mfr=true.
"Dashboard Reporting" (Retrieved Feb. 7, 2008), http://www.synaptris.com/products/lotus-notes/intelliprint-dashboard/key-features.html.
"Filters in Dashboard Designer" (Retrieved Feb. 7, 2008), http://office.rnicrosoft.com/en-us/performancepoint/HA102464041033.aspx.
"Creating Dashboard Reports" (Retrieved Feb. 7, 2008), https://www.rgbluedataconnect.com/futrixweb/docs/bcbssc/manuals/e_dashb.pdf.

* cited by examiner

*Primary Examiner* — Apu Mofiz
*Assistant Examiner* — Chelcie Daye (57) ABSTRACT

Techniques for filter sharing are described. An apparatus may comprise a shared filter manager component for an application program. The shared filter manager component may be operative to manage shared filtering operations for the application program. The shared filter manager component may comprise a shared filter interface module operative to receive a selection for a shared filter component to filter multiple source data objects, and assign the shared filter component to the multiple source data objects. The shared filter manager component may further comprise a shared filter control module communicatively coupled to the shared filter interface module. The shared filter control module may be operative to filter data from the multiple source data objects using the shared filter component. Other embodiments are described and claimed.

14 Claims, 7 Drawing Sheets

RECEIVE A SELECTION FOR A SHARED FILTER COMPONENT
*602*

ASSIGN THE SHARED FILTER COMPONENT TO MULTIPLE DATA SOURCES
*604*

FILTER DATA FROM MULTIPLE DATA SOURCES USING THE SHARED FILTER COMPONENT
*606*

TECHNIQUES FOR FILTER SHARING

BACKGROUND

From a data management perspective, filters are used to sort through and find relevant information in larger data sets, such as stored by various spreadsheet applications and database management solutions. For example, an application program such as a spreadsheet may use multiple filters to sort information from a local or network data source, such as a work sheet, data summary table, or a database. When using multiple data sources and multiple filters for an application program, however, it becomes difficult to manage the filters to produce the desired filter results. For example, each filter connected to each data source may need to be individually modified to filter relevant information for a common field. This problem becomes further exacerbated with increases in a number of selected filters, size of a data set, or a number of data sources linked to the filters. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for filter sharing for an application program. Some embodiments are particularly directed to filter sharing techniques to allow a user to manage a single filter component suitable for use with multiple source data objects. The filter sharing techniques may be implemented for an application program when one or more shared filters are used to filter information from one or more source data objects.

In one embodiment, for example, an apparatus may comprise a shared filter manager component for an application program. The shared filter manager component may be operative to manage shared filtering operations for the application program. The shared filter manager component may comprise a shared filter interface module operative to receive a selection for a shared filter component to filter multiple source data objects, and assign the shared filter component to the multiple source data objects. The shared filter manager component may further comprise a shared filter control module communicatively coupled to the shared filter interface module. The shared filter control module may be operative to filter data from the multiple source data objects using the shared filter component. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to techniques for filter sharing for an application program, such as a spreadsheet application program, among others. Some embodiments are particularly directed to filter sharing techniques for managing a shared filter component suitable for use with multiple source data objects. The filter sharing techniques may be implemented for an application program when one or more shared filters are used to filter information from one or more source data objects. A source data object may comprise any defined data set suitable for filtering. Examples of a source data object may include without limitation various data summary tools provided by a spreadsheet application, such as a work sheet, a workbook, a data summary table such as a PivotTable®, a report, a chart, a graph, a function, and so forth. The source data objects may be stored in various physical or logical data stores, such as a local data store for an application program implementing the filter sharing techniques, a local data store for another application program, a shared data store for multiple application programs, memory for a local device, memory for a remote device, a network database, a database management system (DBMS) database, and so forth. The embodiments are not limited in this context.

Conventional filtering techniques typically utilize a single filter component for each source data object. This creates complexity and productivity issues for an operator, and potentially impacts performance of an application program. For example, assume an operator may desire to view all products sold in 2007. Such information may be contained or stored in various discrete logical data sets, each with its own filter component that needs to be programmed with the desired filter criteria. An operator would need to configure each filter component separately for the desired filter criteria, and then each data set would need to be filtered individually with its corresponding filter component to retrieve the desired information. The different filter results would then be collected and tabulated by the operator. This is a tedious and time consuming process from a user perspective. In some cases, the target information may even be contained or stored in various discrete physical data stores, including local and network data stores. This provides an additional layer of complexity to the multiple filter problems, thereby further decreasing user experience and increasing latency times.

To solve these and other problems, various embodiments are generally directed to various filter sharing techniques designed to enhance filtering operations for an application program thereby leading to enhanced user experience for an operator. The filter sharing techniques may be particularly directed to managing a shared filter component suitable for use with multiple source data objects. An application program may use the filter sharing techniques to configure and manage one or more shared filter components, each capable of filtering information from multiple source data objects at the same time. The filter sharing techniques provide a single integrated user interface having user interface tools designed to allow an operator to connect a shared filter component with various source data objects, such as various data summary tables, reports, charts, spreadsheet functions, and so forth. The shared filter component can then filter the multiple source data objects at the same time. This allows an operator to manage and use a single shared filter component with multiple source data objects, thereby facilitating filtering operations when looking for specific types of information across multiple data sets. As a result, an operator may search, filter and organize data in a more efficient and effective manner, thereby leading to an enhanced user experience.

Additionally or alternatively, the shared filter component may be designed to participate in a calculation chain for a spreadsheet application. For example, the shared filter component may be implemented as part of an argument for a spreadsheet function. When the spreadsheet needs to be recalculated, and the spreadsheet function referencing the shared filter component is within the calculation chain, the shared filter component may reapply filtering operations as part of the spreadsheet recalculations. Similarly, filtering operations may cause a spreadsheet to recalculate based on certain dependencies in the spreadsheet.

Figure 1:
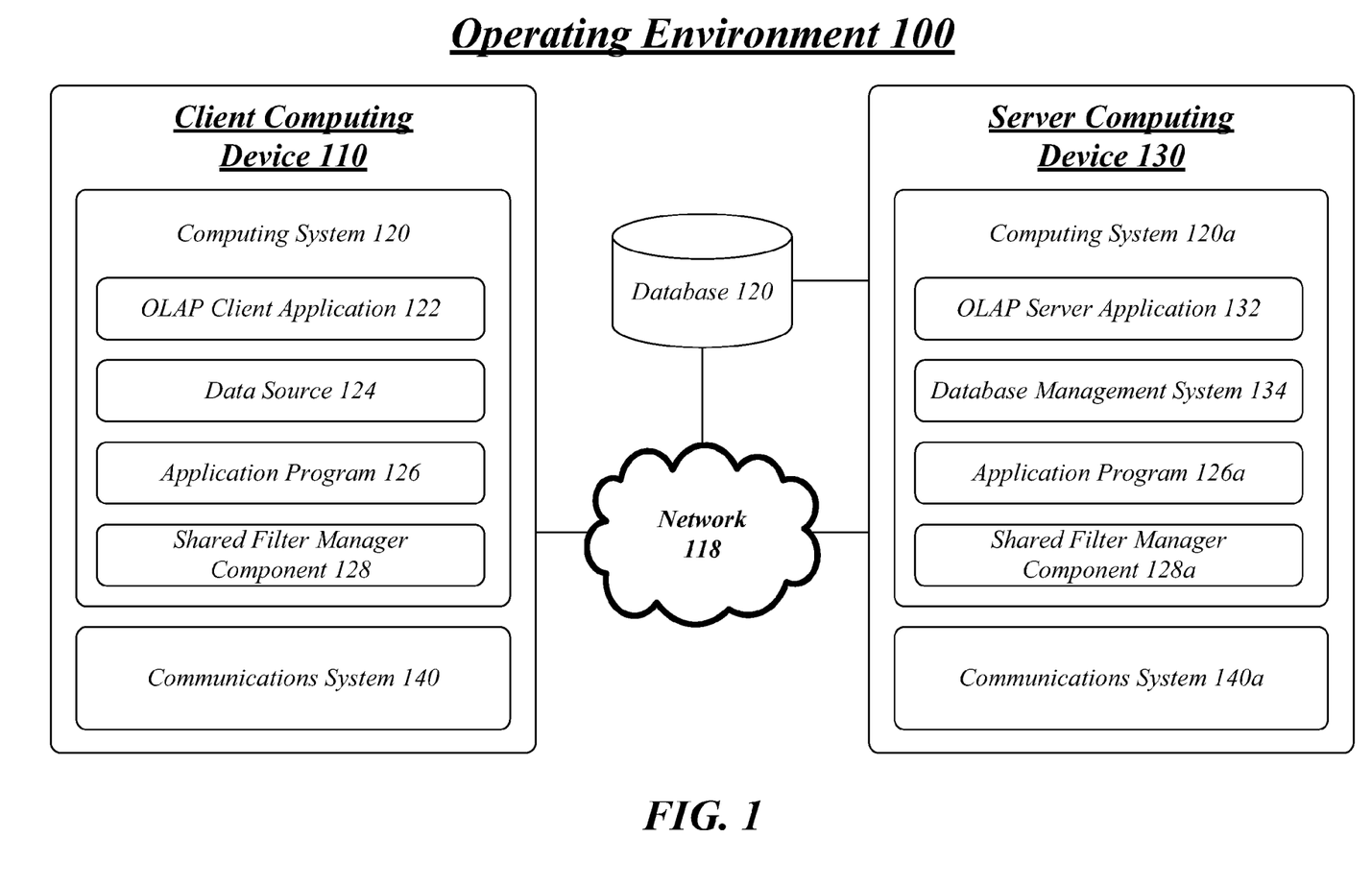
FIG. 1 illustrates an embodiment of an operating environment.

FIG. 1 illustrates a block diagram for an operating environment 100. The operating environment 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the operating environment 100 may comprise, among other elements, a client computing device 110 and a server computing device 130. The computing devices 110, 130 may be implemented utilizing any suitable electronic device having computing capabilities and communications capabilities. Examples for computing devices 110, 130 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the operating environment 100 as shown in FIG. 1 has a limited number of elements in a certain topology, it may be appreciated that the operating environment 100 may include more or less elements in alternate topologies as desired for a given implementation.

The computing devices 110, 130 may be communicatively coupled via a network 118 and appropriate wireless or wired communications media. The computing devices 110, 130 may coordinate operations between each other. The coordination may involve the unidirectional or bi-directional exchange of information. For instance, the computing devices 110, 130 may communicate information over the network 118. The network 118 may comprise a packet-switched network, a circuit-switched network, or a combination of both. The information can be implemented as data messages sent across various network interfaces. Exemplary network interfaces include parallel interfaces, serial interfaces, and bus interfaces.

In various embodiments, the computing devices 110, 130 may implement respective computing systems 120, 120a and respective communications systems 140, 140a. The computing systems 120, 120a include various common computing elements, such as one or more processors, co-processors, memory units, chipsets, controllers, peripherals, interfaces, oscillators, timing devices, video cards, audio cards, multimedia input/output (I/O) components, and so forth. The communications systems 140, 140a include various common communications elements, such as a transmitter, receiver, transceiver, radio, network interface, baseband processor, antenna, amplifiers, filters, and so forth. In one embodiment, for example, the computing devices 110, 130 may be implemented using a computing and communications architecture as described with reference to FIG. 2.

The computing systems 120, 120a may include, among other elements, respective online analytical processing (OLAP) client application 122 and OLAP server application 132. The OLAP client application 122 and the OLAP server application 132 are designed to implement various OLAP techniques. OLAP is a category of software tools that provides analysis of data stored in a database, such as local data source 124 and/or network database 120. OLAP tools enable users to analyze different dimensions of multidimensional data. One of the main components of an OLAP architecture includes the OLAP server application 132, which is typically located between the OLAP client application 122 and a database management system (DBMS) 134. The OLAP server application 132 understands how data is organized in the database 120 and has special functions for analyzing the data. The OLAP server application 132 is capable of receiving instructions from an OLAP client application 122 via the network 118, and capable of returning filter results from filtering operations performed on data sets stored by various data sources under the management of the DBMS 134, such as the database 120.

The computing systems 120, 120a may further include application programs 126, 126a. The application programs 126, 126a may comprise any type of application program offering features to filter or sort data sets from one or more data sources. Examples for application programs 126, 126a may include without limitation a spreadsheet application program such as MICROSOFT® EXCEL®, a database application program such as MICROSOFT ACCESS, and so forth. Both MICROSOFT EXCEL and MICROSOFT ACCESS are application programs made by Microsoft Corporation, Redmond, Wash. The application program 126 may comprise a local version of an application program, while the application program 126a may comprise a network, server or web-based version of an application program. The application programs 126, 126a may operate separately, such as when the client computing device 110 is in an offline state, or interoperate when the client computing device 110 is in an online state and connected to the server computing device 130.

The shared filter manager components 128, 128a may be generally arranged to manage filtering operations for the respective application programs 126, 126a. For example, the application program 126 may perform filtering operations on source data objects stored by the data source 124 and/or the database 120 (directly or indirectly via the DBMS 134) using the shared filter manager component 128. More particularly, the shared filter manager components 128, 128a may implement various filter sharing techniques. Although the shared filter manager component 128 is shown as separate from the application program 126, it may be appreciated that the shared filter manager component 128 may be integrated with the application program 126 and its native filtering features.

In various embodiments, the shared filter manager components 128, 128a may implement various filter sharing techniques designed to enhance filtering operations for an application program thereby leading to enhanced user experience for an operator. The shared filter manager components 128, 128a may be generally arranged to manage a shared filter component suitable for use with multiple source data objects. As used herein, the term "filter component," "local filter component," "shared filter component" and similar terminology may refer to any software-based filter using any filter criteria suitable for filtering data from a source data object. Examples of a filter component or shared filter component may include without limitation a cell or field for a spreadsheet, a cell or field value, an expression with multiple values, a formula, a function, alphanumeric information, text, symbols, punctuation, and any other terms or filter data elements suitable for use in searching, sorting and filtering data from a data set. In some cases, a single filter component may comprise a single filter criterion or filter data element. In other cases, a single filter component may comprise multiple filter criteria or filter data elements. The embodiments are not limited in this context.

The application programs 126, 126a may utilize the respective shared filter manager components 128, 128a to configure and manage one or more shared filter components, each capable of filtering information from multiple source data objects at the same time. The shared filter manager components 128, 128a provide a single integrated user interface having user interface tools designed to allow an operator to connect a shared filter component with various source data objects, such as various data summary tables, reports, charts, spreadsheet functions, and so forth. The shared filter component can then be used to filter the multiple source data objects at the same time. This allows an operator to manage and use a single shared filter component with multiple source data objects, thereby facilitating filtering operations when looking for specific types of information across multiple data sets.

Additionally or alternatively, the shared filter component may participate in a calculation chain for a spreadsheet application. For example, the shared filter component may be implemented as part of an argument for a spreadsheet function. When the spreadsheet needs recalculated, and the spreadsheet function having the shared filter component is within the calculation chain, the shared filter component may reapply filtering operations as part of the spreadsheet recalculations. Similarly, filtering operations may cause a spreadsheet to recalculate based on certain dependencies in the spreadsheet.

Figure 2:
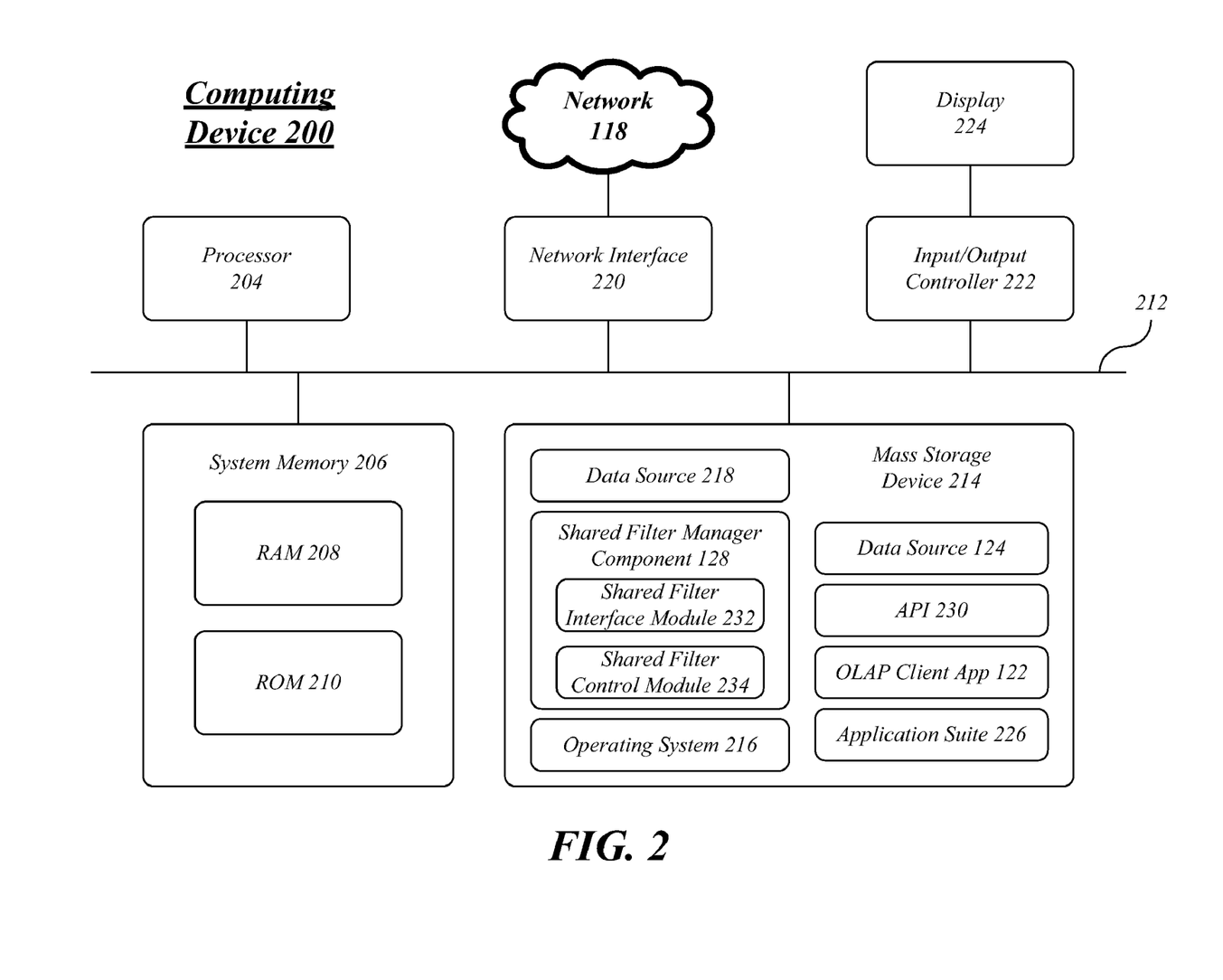
FIG. 2 illustrates an embodiment of a computing apparatus.

FIG. 2 provides an illustrative architecture for a computing device 200 suitable for practicing the various embodiments. The computing device 200 may be representative of, for example, the client computing device 110 and/or the server computing device 130. The computing device 200 as shown in FIG. 2 illustrates a conventional computing architecture for a personal or server computer, including a processing system comprising a processor 204 and a system memory 206. The system memory 206 may include, among other types of memory, a random access memory (RAM) 208 and a read-only memory (ROM) 210. An input/output (I/O) controller 222 system implements I/O routines to assist in transferring information between elements within the computing device 200, such as during startup operations, using logic stored in the ROM 212. The computing device 200 further includes a mass storage device 214 for storing an operating system (OS) 216, various application programs from an application suite 226 (such as the application programs 126, 126a), and various data sets via the data sources 124, 218. A system bus 212 communicatively couples all of the elements of the computing device 200 to facilitate information transfer and data processing operations.

The mass storage device 214 is connected to the processor 204 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the embodiments, the computing device 200 may operate in a networked environment using logical connections to remote computers through a Transmission Control Protocol (TCP) and Internet Protocol (IP) network 118, such as the Internet. The computing device 200 may connect to the TCP/IP network 118 through a network interface 220 (e.g., a wired or wireless network interface) connected to the system bus 212. It should be appreciated that the network interface 220 may also be utilized to connect to other types of networks and remote computer systems. The computing device 200 may also include the I/O controller 222 for receiving and processing input from a number of devices, including a keyboard, mouse, or microphone (not shown). Similarly, the I/O controller 222 may provide output to various output devices, such as the display device 223, speaker or a printer (not shown).

As mentioned briefly above, a number of program modules and data files may be stored in the mass storage device 214 and RAM 208 of the computing device 200, including the OS 216 suitable for controlling the operation of a computing device. An example for the OS 216 may include without limitation the MICROSOFT WINDOWS® line of operating systems made by Microsoft Corporation, Redmond, Wash. The mass storage device 214 and RAM 208 may also store one or more application programs. In particular, the mass storage device 214 and RAM 208 may store an application program suite 226 for providing a variety of functionality and operations for a user. For instance, the application program suite 226 may comprise many types of different application programs, such as a word processing application program, a spreadsheet application program, a desktop publishing application program, a database application program, and the like. According to one embodiment, the application program suite 226 comprises a multiple functionality software application suite, such as one or more application programs from the MICROSOFT OFFICE suite of productivity software made by Microsoft Corporation, Redmond, Wash. When implemented as the client computing device 110, the computing device 200 may include other application programs and data that may be stored by the mass storage device 214, such as the OLAP client application 122, the application program 126, the filter manager component 108, and the data sources 124, 218, among others. When implemented as the server computing device 130, the computing device 200 may include other application programs and data that may be stored by the mass storage device 214, such as the OLAP server application 132, the DBMS 134, the application program 126a, and the shared filter manager component 128a, among others.

The mass storage device 214 may further include the shared filter manager components 128, 128a. The shared filter manager components 128, 128a may generally manage or control multiple shared filter components for use by an application program implemented by the computing device 200, such as the application programs 126, 126a, or application programs implemented on separate devices. More particularly, the shared filter manager components 128, 128a are operative to manage shared filtering operations using multiple shared filter components for the application programs 126, 126a. The shared filter components may be implemented natively by the application programs 126, 126a, or exposed by an application program interface 230. The shared filter components may be used to filter different data sets stored by the data sources 124, 218. For example, the data source 124 may include external relational data or OLAP data, while the data source 218 is a data source internal to the application program 126 and may include relational sheet data, for example, from a spreadsheet application program.

In various embodiment, the shared filter manager component 128 (as also applicable to 128a) is operative to manage shared filtering operations for the application program 126. The shared filter manager component 128 may comprise, among other elements, a shared filter interface module 232 communicatively coupled to a shared interface module 234.

The shared filter manager component 128 may comprise a shared filter interface module 232. The shared filter interface module 232 is generally operative to provide user interface tools and views for the shared filter manager component 128. For example, the shared filter interface module 232 may utilize any number of GUI tools and techniques to generate various GUI views of shared filter components, and feature selection tools to configure the shared filter component for use with multiple source data objects. The shared filter interface module 232 may also be arranged to accept input commands and control directives from a user or operator, such as when connecting a shared filter component to a source data object, or selecting a filter data element from the shared filter component to initiate filtering operations.

The shared filter manager component 128 may further comprise a shared filter control module 234 communicatively coupled to the shared filter interface module 232. The shared filter control module 234 is generally operative to control shared filter operations for the shared filter components. The shared filter control module 234 implements control logic to control filtering operations on the data sets provide by the source data objects and stored by the various data sources, such as the data source 124, the data source 218, or the database 120.

Figure 3:
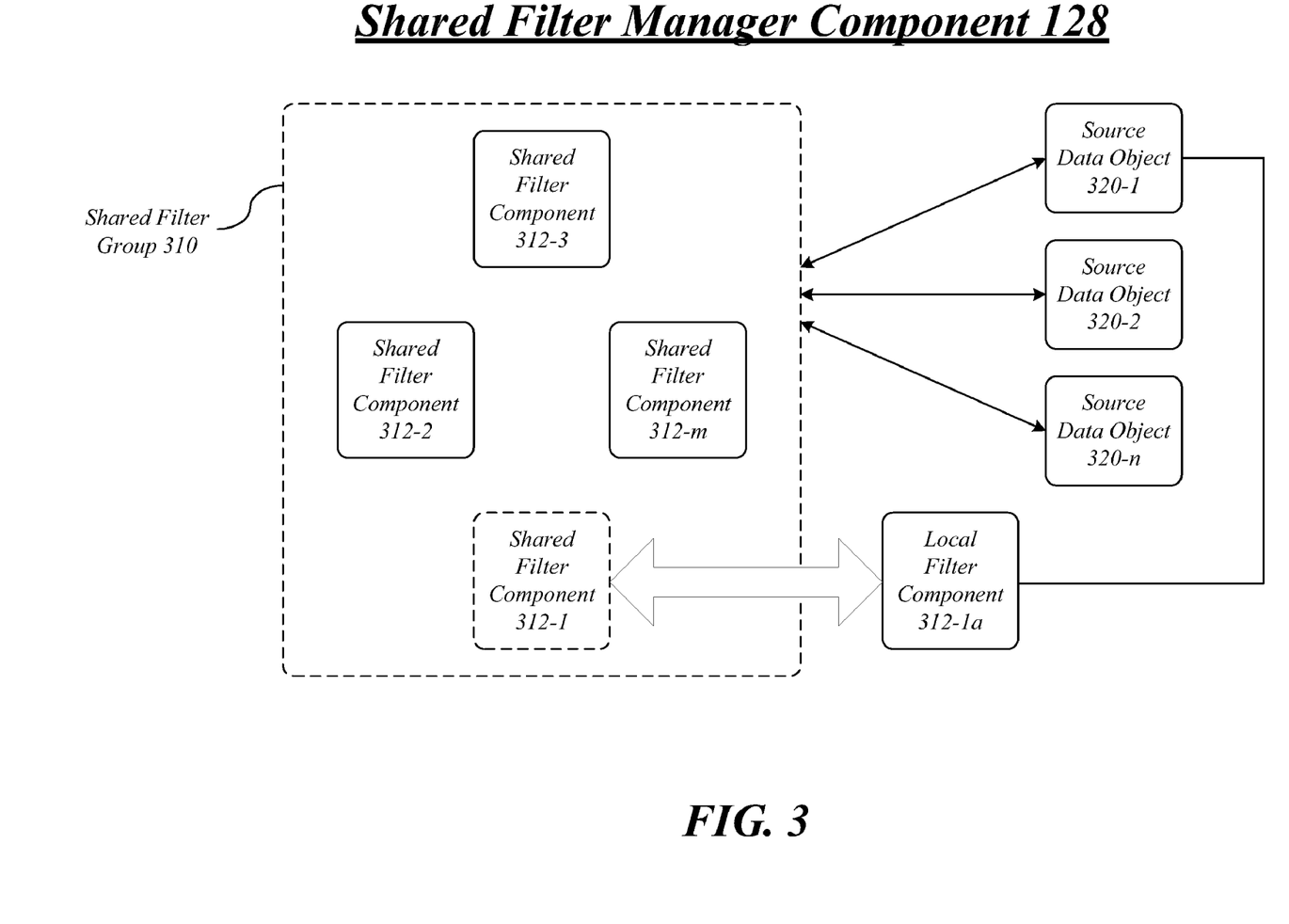
FIG. 3 illustrates an embodiment of filter sharing.

FIG. 3 illustrates an embodiment of a logical diagram for shared filter manager component 128. In the illustrated embodiment shown in FIG. 3, the shared filter manager component 128 may manage shared and non-shared filter components. For example, the shared filter manager component 128 may manage a shared filter group 310. The shared filter group 310 may comprise multiple shared filter components 312-1-$m$. One or more of the shared filter components 312-1-$m$ may be communicatively coupled to two or more source data objects 320-1-$n$. The shared filter manager component 128 may also manage non-shared filter components, as represented by a local filter component 312-1a connected to the source data object 320-1. The term "local filter component" typically refers to a filter component that is used to filter only a single source data object. The term "shared filter component" typically refers to a filter component that is used to filter multiple source data objects.

Sharing of the local filter component 312-1a enables the multiple source data objects 320-1-$n$ to use the same local filter component 312-1a. When the local filter component 312-1a is configured to filter multiple source data objects 320-1-$n$, it is subsequently referred to as a shared filter component, such as the shared filter component 312-1 and joins the shared filter group 310. This means that the local filter component 312-1a as converted to a shared filter component 312-1 can now filter multiple source data objects 320-1-n at the same time.

When source data objects 320-1-n share filter components, they share all filter components. A source data object 320-1-n involved in a sharing relationship typically does not have any local filter components. In effect, all source data objects 320-1-n involved in a share use a common pool of filter components, such as the shared filter components 312-1-m of the shared filter group 310. Furthermore, all source data objects 320-1-n involved in a share can use only the shared filter components 312-1-m in the shared filter group 310. A user may optionally select whether to have one source data object 320-1-n use the same filter components as another source data object 320-1-n.

When a share is setup between source data objects 320-1-n a common set of shared filter components 312-1-m is formed which is used by all source data objects 320-1-n participating in the share. Each source data object 320-1-n is filtered by all shared filter components 312-1-m in the shared filter group 310, and filter user interface views for each source data object 320-1-n can be used to ADD or DELETE filter components from the shared filter group 310. It is worthy to note that the definition of a shared filter group is typically based on which data sources to which each filter is hooked or connected. For example, the shared filter component 312-3 might only filter two of the source data objects in the figure while the other filters in the group filter them all. The embodiments are not limited in this context.

Once a source data object 320-1-n is in a share, a specific implementation can choose to disallow a user from adding a new filter component which acts only on that specific source data object 320-1-n. Rather, any new filter component attached to any source data object 320-1-n is added to the shared filter group 310 and filters all source data objects 320-1-n in the share. The same is also true for deleting a shared filter component 312-1-m from the shared filter group 310.

Referring again to FIG. 2, the shared filter manager component 128 may be used by the application program 126 to manage shared filter operations for the application program 126. The shared filter manager component 128 may include the shared filter interface module 232 communicatively coupled to the shared filter control module 234. The shared filter interface module 232 is operative to receive a selection for a shared filter component 312-1-m to filter multiple source data objects 320-1-n. The shared filter interface module 232 assigns the shared filter component 312-1-m to the multiple source data objects 320-1-n in accordance with the selection. The shared filter control module 234 may filter data from the multiple source data objects 320-1-n using the shared filter component 312-1-m.

The shared filter interface module 232 is operative to receive a selection for a shared filter component 312-1-m to filter multiple source data objects 320-1-n. In one embodiment, the selection may be made in response to user commands. For example, the shared filter interface module 232 may generate various GUI views that allow a user to select from among multiple candidate source data objects 320-1-n to connect with a given shared filter component 312-1-m.

The shared filter interface module 232 is further operative to assign the shared filter component 312-1-m to the multiple source data objects 320-1-n in accordance with the selections made using the GUI views. For example, assume a user selects the shared filter component 312-2 to share with source data objects 320-2, 320-3. The shared filter interface module 232 assigns the shared filter component 312-2 to the source data objects 320-2, 320-3, thereby establishing a connection between the shared filter component 312-2 and the source data objects 320-2, 320-3.

Furthermore, the shared filter interface module 232 is operative to assign any shared filter components 312-1-m used by the multiple source data objects 320-1-n to the shared filter group 310 of the shared filter components 312-1-m. When a user selects a source data object 320-1-n, the shared filter interface module 232 may also display other shared filter components 312-1-m that are already connected to the selected source data object 320-1-n. In this manner, the user will know which shared filter components 312-1-m are within the shared filter group 310 once a data source 320-1-n has been selected. For example, assume a user selects the source data object 320-1 to connect to the local filter component 312-1a. Further assume the user selects the shared filter component 312-2 to connect with the source data object 320-1. Since the source data object 320-1 already has a connection with the local filter component 312-1a, the local filter component 312-1a automatically becomes the shared filter component 312-1 and joins the shared filter group 310.

In some cases, the shared filter interface module 232 may be arranged to implement a hierarchical auto-selection techniques. The hierarchical auto-selection technique automatically selects a shared filter component that has a hierarchical relationship with another shared filter component. The shared filter interface module 232 may automatically select another shared filter component 312-1-m in a same hierarchy as the selected shared filter component 312-1-m. When a user selects a shared filter component 312-1-m, the shared filter interface module 232 may use the hierarchical auto-selection technique to select some or all of the shared filter components 312-1-m that are within the same hierarchy of the originally selected shared filter component 312-1-m. This may include parent (ascendant) shared filter components 312-1-m or children (descendent) shared filter components 312-1-m. For example, if a user selects a shared filter component 312-1-m for a "Country" than the shared filter interface module 232 may automatically select the "Cities" that are within the "Country," and vice-versa.

In one embodiment, the shared filter interface module 232 may be arranged to assign the shared filter component to a spreadsheet formula. By way of example, assume the application program 126 comprises a spreadsheet application program having a spreadsheet function CUBEVALUE that references two shared filter components 312-1-m, as follows:

=CUBEVALUE ("Adventure Works sales data in OLAP cube", Product_Categories, Promotions, $A$4, $A6, B$5)

In this example, the second and third arguments of the CUBEVALUE function reference two shared filter components 312-1, 312-2 named Product_Categories and Promotions. The first argument specifies the external connection which is an OLAP server in the example. The fourth, fifth and sixth arguments specify references to cells with CUBEMEMBER functions, where the CUBEMEMBER function specifies a single member or measure, like "USA" or "Sales" for example. Here are examples of the formulas in the referenced cells:

A4: =CUBEMEMBER("Adventure Works sales data in OLAP cube", "[Measures].[Internet Sales Amount]")

A6: =CUBEMEMBER("Adventure Works sales data in OLAP cube", "[Customer].[Customer Geography].[Country].&[Australia]")

B5: =CUBEMEMBER("Adventure Works sales data in OLAP cube", "[Date].[Fiscal].[FiscalYear].&[2002]")

The shared filter control module 234 may cause a spreadsheet formula to be recalculated when a shared filter component 312-1-$m$ produces different filter results. Recalculation occurs when the user changes a selection in one of the shared filter components 312-1, 312-2. For example, if the user changes the selection in the "Country" shared filter component 312-1 from "USA" to "Canada," then all formulas referencing the "Country" shared filter component 312-1 will be recalculated to produce the values for "Canada" and that will in turn initiate recalculation of any other formulas that depend on the formulas that were just recalculated. The spreadsheet application maintains a calculation chain to keep track of all the calculation dependencies across formulas and objects.

Similarly, the shared filter control module 234 may be arranged to filter the multiple source data objects 320-1-$n$ to obtain filter results when a calculation chain having the spreadsheet formula is recalculated. Recalculation can also happen the other way around. That is if a shared filter component 312-1-$m$ is based on data in the cells of the spreadsheet application for example, than changes made to that data will force the shared filter component 312-1-$m$ to be recalculated/refreshed to pick up the new data set. For example, a new country might be added to the source data object 320-1-$m$ (e.g., a table) containing the countries that are available in the "Country" shared filter component 312-1-$m$ and then the "Country" shared filter component 312-1-$m$ is recalculated or refreshed to show that new country along with the already existing countries.

Figure 4:
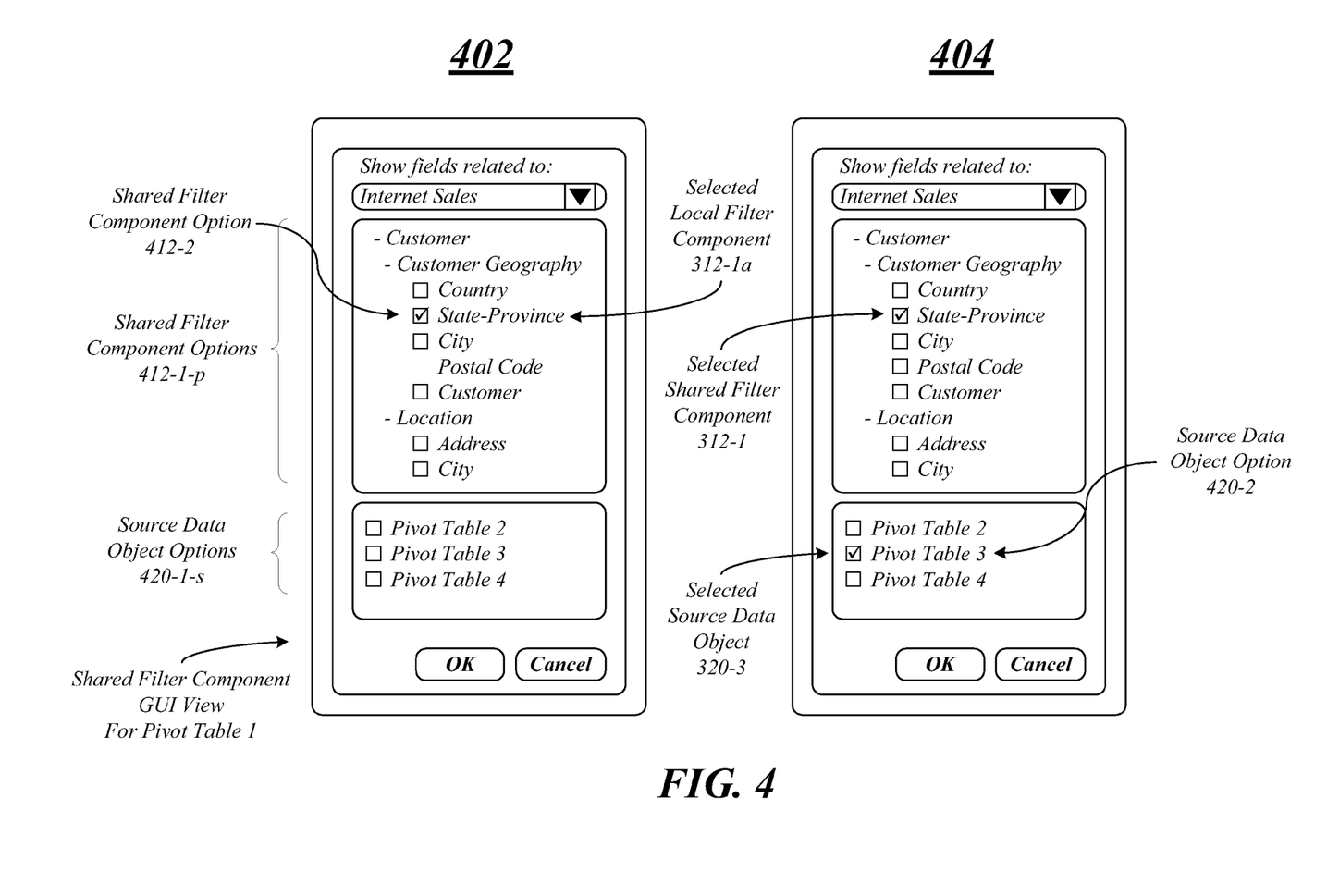
FIG. 4 illustrates embodiments of filter user interface views.

FIG. 4 illustrates embodiments of filter user interface views 402, 404. The filter user interface views 402, 404 may be generated by the shared filter interface module 232. The filter user interface views 402, 404 provide exemplary GUI views for managing filter sharing operations for the shared filter components 312-1-$m$ and/or the source data objects 320-1-$n$. For example, when prompted the shared filter interface module 232 may initiate a dialog with a user via the filter user interface views 402, 404 in order to configure filter sharing parameters, such as share creation operations and share deletion operations for the shared filter components 312-1-$m$.

The filter interface views 402, 404 provide examples of various shared filter component options 412-1-$p$ and various source data object options 420-1-$s$. The shared filter component options 412-1-$p$ may correspond to selections for shared filter components 312-1-$m$, while the source data object options 420-1-$s$ may correspond to selections for source data objects 320-1-$n$. It is worthy to note that only those source data objects 320-1-$n$ using the same connection as the current source data object 320-1 (from which the filter interface views 402, 404 are opened) appears as source data object options 420-1-$s$.

The filter interface view 402 illustrates that a shared filter component option 412-2 for "State-Province" is already selected by a user. At this point, the corresponding selected local filter component 312-1$a$ is only associated with a single source data object 320-1 since none of the source data object options 420-1-$s$ have been selected yet. In this case, the local filter component 312-1$a$ filters only the current source data object 320-1. Furthermore, adding or removing filter components affects only the current source data object 320-1.

The filter interface view 404 illustrates a case where the source data object option 420-2 is selected. This selection associates the local filter component 312-1$a$ with both source data objects 320-1, 320-3, thereby converting the local filter component 312-1$a$ to the shared filter component 312-1. In this case, the shared filter component 312-1 filters the current source data object 320-1 as well as the selected source data object 320-3. For example, the current source data object 320-1 may include the filter components for the first PivotTable. Furthermore, adding or removing filter components affects both source data objects 320-1, 320-3.

When a user selects a source data object 320-1-$n$ with which to share filter components, all filter components currently used by the selected filter component are automatically selected in the list of shared filter component options 412-1-$p$. This may be further described with reference to FIG. 5

Figure 5:
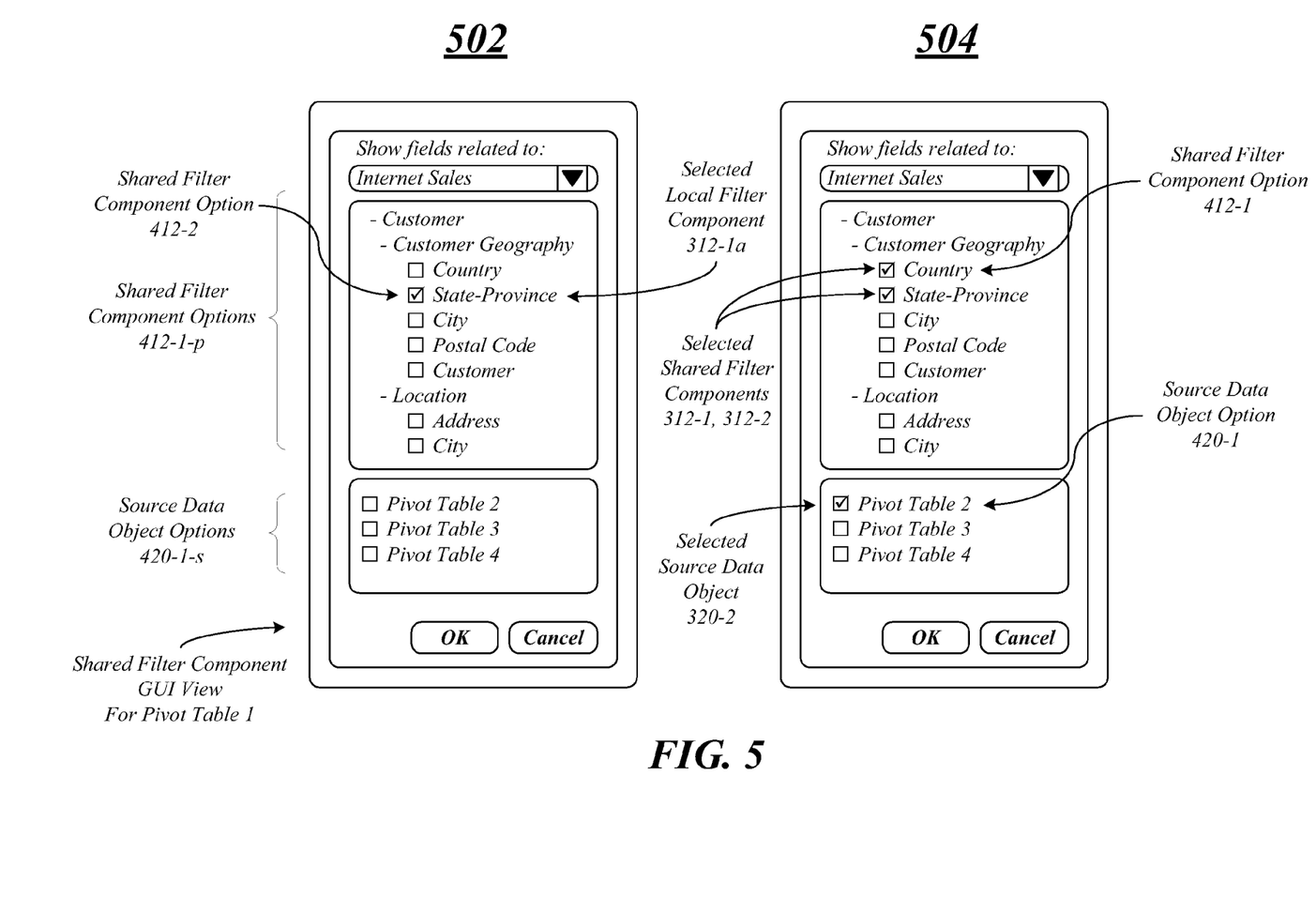
FIG. 5 illustrates embodiments of filter user interface views.

FIG. 5 illustrates embodiments of filter user interface views 502, 504. The filter user interface views 502, 504 are similar to the filter user interface views 402, 404 as described with reference to FIG. 4. The filter user interface views 502, 504, however, illustrate a case where filter components for a source data object are inherited by a shared filter component. Whether the filter components are local filter components or shared filter components prior to inheritance, the filter components become shared filter components after inherited.

The filter user interface view 502 has a state similar to the filter user interface view 402. The shared filter component option 412-2 is selected, and the selected local filter component 312-1$a$ filters only the single source data object 420-1.

The filter user interface view 504 has a state where the source data object option 420-1 is selected, thereby assigning the selected local filer component 312-1$a$ with both source data objects 320-1, 320-2. In this case, the selected filter component 312-1$a$ becomes the shared filter component 312-1 and is made part of the shared filter group 310. In addition, assume the source data object 320-2 is previously assigned to the shared filter component 312-2. After selecting to share with the source data object 320-2, the shared filter component option 412-1 is automatically selected indicating that the source data object 320-1 is now using the shared filter component 312-2. It is worthy to note that if the user displayed a filter user interface view for the source data object 320-2, the selected shared filter components 312-1, 312-2 would be the same. The only difference would be that a source data object option for the source data object 320-1 would be displayed and selected in place of the source data object option for the source data object 320-2. Adding or deleting source data objects 320-1-$n$ can be accomplished in a manner similar to described above.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
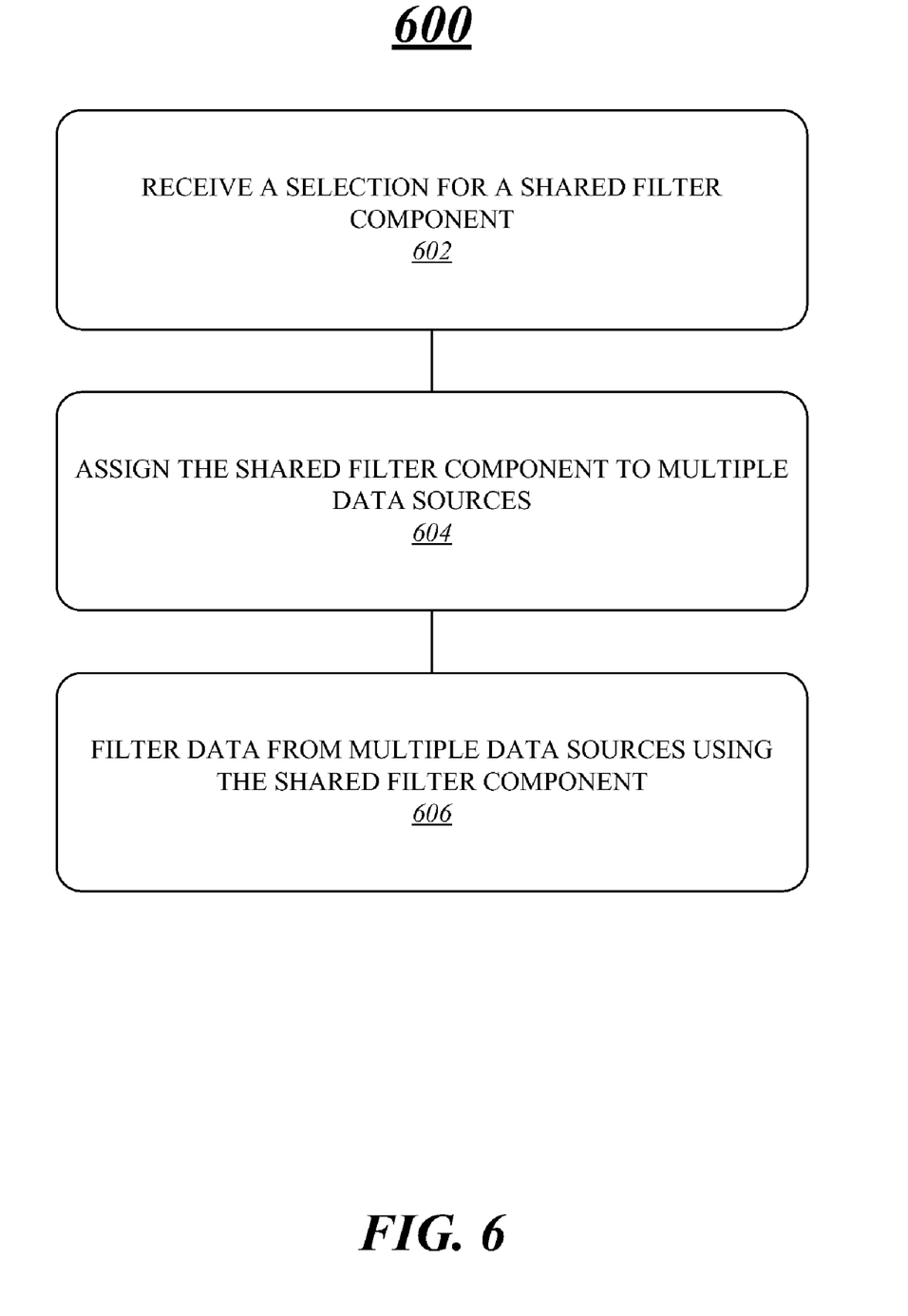
FIG. 6 illustrates an embodiment of a logic flow.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a selection for a shared filter component at block 602. For example, the shared filter interface module 232 may receive a selection for a shared filter component 312-1-$m$ via one or more filter user views. The selections may be in response to user commands, or automatically performed using a hierarchical auto-selection technique or when inheriting shared filter components 312-1-*m* from the shared filter group 310.

The logic flow 600 may assign the shared filter component to multiple source data objects at block 604. For example, the shared filter interface module 232 may assign the shared filter component 312-1-*m* to multiple source data objects 320-1-*n*. Examples for the source data objects 320-1-*n* may include any consumer of filter services provided by the shared filter components 312-1-*m*, including a work sheet, a workbook, a data summary table such as a PivotTable, a report, a chart, a graph, a function, and so forth.

The logic flow 600 may filter data from multiple source data objects using the shared filter component at block 606. For example, the shared filter control module 234 may filter data from the multiple source data objects 320-1-*n* using the shared filter component 312-1-*m*. The shared filter control module 234 may also filter data from the multiple source data objects 320-1-*n* using additional shared filter components 312-1-*m* that are part of the same shared filter group 310.

Figure 7:
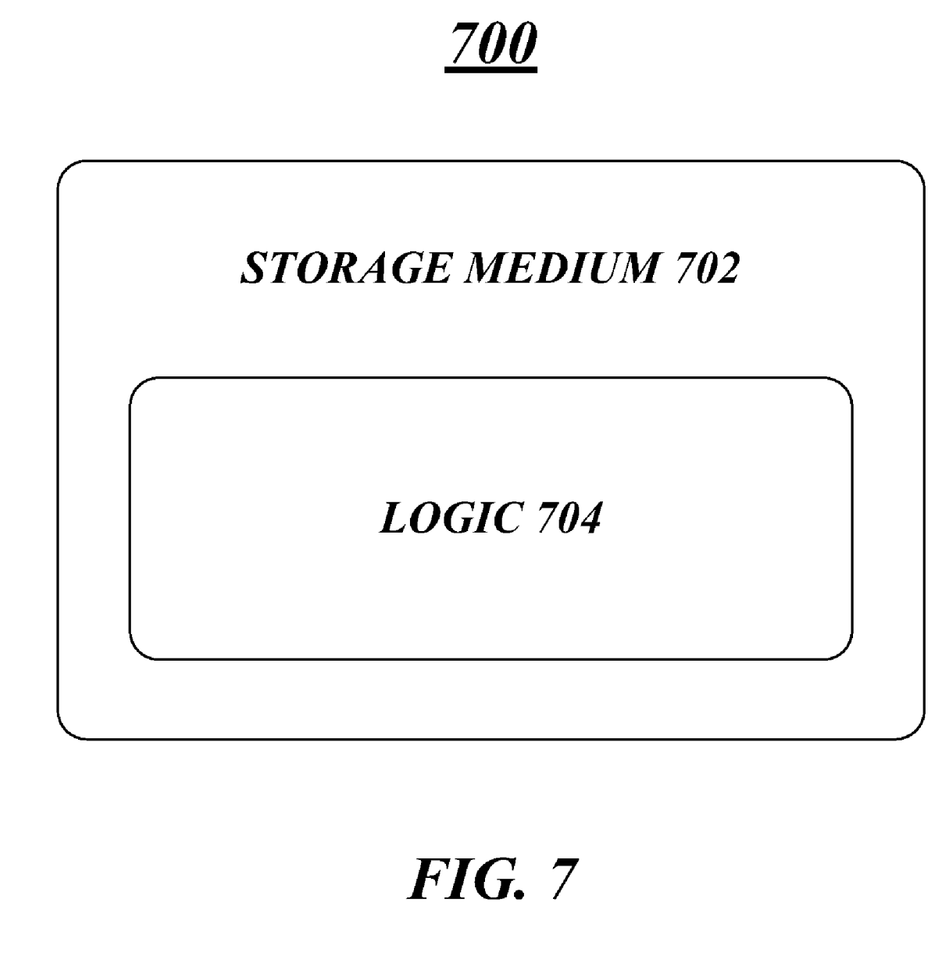
FIG. 7 illustrates an embodiment of an article.

FIG. 7 illustrates a diagram an article of manufacture 700 suitable for storing logic for the various embodiments. As shown, the article of manufacture 700 may comprise a storage medium 702 to store logic 704. Examples of the storage medium 702 may include one or more types of computer-readable storage media capable of storing electronic data, including volatile memory or non-volatile memory, removable or non-removable memory, erasable or non-erasable memory, writeable or re-writeable memory, and so forth. Examples of the logic 704 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 700 and/or the computer-readable storage medium 702 may store logic 704 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
opening a filter interface view from a first source data object;
displaying at least one of a shared and a local filter component, and at least one source data object in the filter interface view;
receiving a selection for a filter component from the filter interface view;
receiving a selection for a second source data object from the filter interface view, wherein the second source data object is not assigned to the selected filter component;

assigning the selected filter component to the first and second source data objects, wherein the selected filter component becomes a shared filter component;

assigning any shared filter components used by the first and second source data objects to a shared filter group of shared filter components, wherein the shared filter components of the shared filter group are usable by the first and second source data objects; and filtering data from multiple source data objects using the shared filter component.

2. The method of claim 1, comprising selecting another shared filter component in a same hierarchy as the selected shared filter component.

3. The method of claim 1, comprising assigning the shared filter component to a spreadsheet formula.

4. The method of claim 1, comprising recalculating a calculation chain having a spreadsheet formula with the shared filter component.

5. The method of claim 1, comprising removing the selected shared filter component from the shared filter group of shared filter components when the selected shared filter component is no longer assigned to any of the multiple source data objects.

6. An article comprising a storage medium containing instructions that when executed enable a system to:

open a filter interface view from a first source data object;

display at least one of a shared and a local filter component, and at least one source data object in the filter interface view;

receive a selection for a first filter component for a source data object;

assign the first filter component to a second source data object, wherein the first filter component becomes a shared filter component and wherein the second source data object was not previously assigned to the selected filter component;

assign any shared filter components for the selected and second source data objects to a shared filter group of shared filter components, wherein the shared filter components of the shared filter group are usable by the selected and second source data objects; and filter data from first and second source data objects using the first shared filter component.

7. The article of claim 6, further comprising instructions that when executed enable the system to select a third shared filter component in a same hierarchy as the selected shared filter component.

8. The article of claim 6, further comprising instructions that when executed enable the system to assign the shared filter component to a spreadsheet formula.

9. The article of claim 6, further comprising instructions that when executed enable the system to recalculate a calculation chain having a spreadsheet formula with the shared filter component.

10. The article of claim 6, further comprising instructions that when executed enable the system to assign the first shared filter component to the second source data object sharing a data connection with the first source data object.

11. An apparatus, comprising:

a processor; and a shared filter manager component for an application program, the shared filter manager component implemented by the processor and operative to manage shared filtering operations for the application program, the shared filter manager component comprising:

a shared filter interface module operative to:

open a filter interface view from a first one of multiple source data objects;

display at least one of a shared and a local filter component, and at least one source data object in the filter interface view;

receive a selection for a filter component from the filter interface view to filter multiple source data objects;

receive a selection of at least one additional source data object of the multiple source data objects from the filter interface view, wherein the at least one additional source data object is not assigned to the selected filter component;

assign the selected filter component to the multiple source data objects, wherein the selected filter component becomes a shared filter component; and assign any shared filter components used by the multiple source data objects to a shared filter group of shared filter components, wherein the shared filter components of the shared filter group are usable by all of the multiple data source objects; and a shared filter control module communicatively coupled to the shared filter interface module, the shared filter control module operative to filter data from the multiple source data objects using the selected shared filter component.

12. The apparatus of claim 11, the shared filter interface module operative to automatically select another shared filter component in a same hierarchy as the selected shared filter component.

13. The apparatus of claim 11, the shared filter interface module operative to assign the shared filter component to a spreadsheet formula.

14. The apparatus of claim 11, the shared filter control module operative to filter the multiple source data objects to obtain filter results when a calculation chain having the spreadsheet formula is recalculated, and cause the spreadsheet formula to be recalculated when the shared filter component produces different filter results.

* * * * *